2,974,151

6-ALKYLIDENESTRA-1,3,5(10)-TRIENE-3,17β-DIOLS AND DERIVATIVES THEREOF

Norman W. Atwater, Arlington Heights, Ill., assignor to G. D. Searle & Co., Chicago, Ill., a corporation of Delaware No Drawing. Filed Mar. 31, 1960, Ser. No. 18,878

7 Claims. (Cl. 260—397.4)

The present invention relates to novel steroidal compounds containing a 6-alkylidene substituent and, more particularly, to 6-alkylidenestra-1,3,5(10)-triene-3,17β-diols and their derivatives. These substances can be represented by the structural formulae

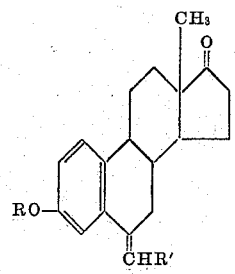

and

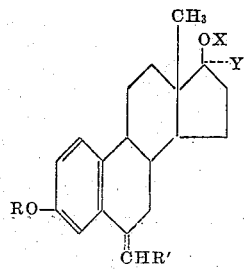

wherein R is selected from the group consisting of hydrogen, lower alkyl, and lower alkanoyl radicals; R' is selected from the group consisting of hydrogen and lower alkyl radicals; X is selected from the group consisting of hydrogen and lower alkanoyl radicals; and Y is selected from the group consisting of hydrogen, lower alkyl, and lower 1-alkynyl radicals.

Examples of lower alkyl groups represented by R, R', and Y are methyl, ethyl, propyl, butyl, pentyl, hexyl, and the branched-chain isomers thereof. The lower alkanoyl radicals encompassed by the R and X terms are typified by formyl, acetyl, propionyl, butyryl, valeryl, caproyl, and their branched-chain isomers. The lower 1-alkynyl radicals designated by Y are, for example, ethynyl, propynyl, butynyl, pentynyl, hexynyl, and the branched-chain isomers thereof.

Starting materials suitable for the manufacture of the compounds of this invention are 3,17-bisoxygenated estra-1,3,5(10)-trien-6-ones. These ketones are condensed with a triphenylphosphinealkylene in an inert organic solvent medium at 0–70° to produce the corresponding 6-alkylidene derivatives. As a specific example, 3,17β-diacetoxyestra-1,3,5(10)-trien-6-one is reacted with triphenylphosphinemethylene in a tetrahydrofuran-ether solution at the reflux temperature to afford, after reacetylation, 3,17β-diacetoxy-6-methylenestra-1,3,5(10)-triene, as shown below:

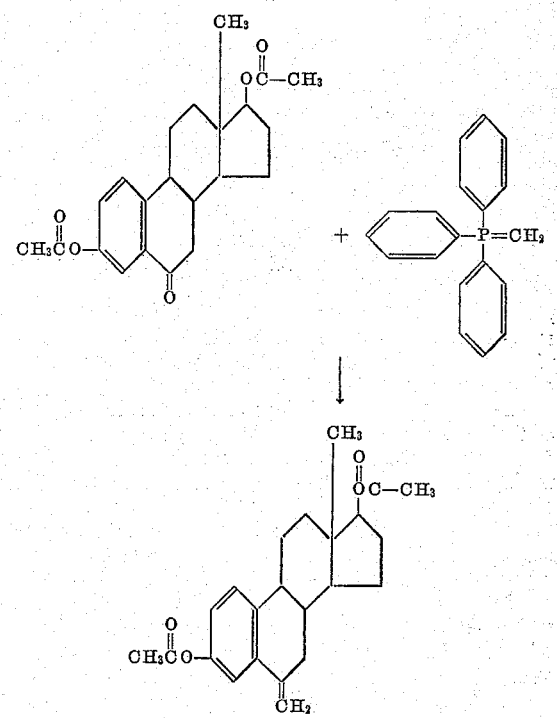

The aforementioned 3,17β-diacetoxyestra-1,3,5(10)-trien-6-one, when treated first with methanolic potassium hydroxide then with an alkylating agent, for example a dialkyl sulfate, affords the corresponding 3-alkoxy-17β-hydroxyestra-1,3,5(10)-trien-6-ones. The latter substances are suitable as intermediates in the preparation of the instant compounds wherein the 3-oxygenated function is etherified. Typically, 17β-hydroxy-3-methoxyestra-1,3,5(10)-trien-6-one is treated with triphenylphosphinemethylene to yield 3-methoxy-6-methylenestra-1,3,5(10)-trien-17β-ol.

Starting materials suitable for the preparation of the instant 3-alkoxy-17α-alkyl-6-alkylidenestra-1,3,5(10)-trien-17β-ols are the corresponding 3-alkoxy-17α-alkylestra-1,3,5(10)-trien-17β-ols. As a specific example of the process involved, 17α-ethyl-3-methoxyestra-1,3,5(10)-trien-17β-ol is oxidized by means of sodium chromate and acetic acid to yield 17α-ethyl-17β-hydroxy-3-methoxyestra-1,3,5(10)-trien-6-one. Treatment of the latter ketone with triphenylphosphinemethylene results in the instant 17α-ethyl-3-methoxy-6-methylenestra-1,3,5(10)-trien-17β-ol.

The 17-keto compounds of this invention are prepared by oxidation of the corresponding 17β-ols, suitably under conditions of the Oppenauer reaction. For example, 3-methoxy-6-methylenestra-1,3,5(10)-trien-17β-ol in toluene is treated with cyclohexanone and aluminum isopropoxide to produce 3-methoxy-6-methylenestra-1,3,5(10)-trien-17-one. Treatment of these 17-keto compounds with a lower 1-alkyne results in the instant 17α-(1-alkynyl)-17β-ols, as demonstrated by the reaction of the aforementioned 3-methoxy-6-methylenestra-1,3,5(10)-trien-17-one with acetylene and potassium hydroxide to afford 17α-ethynyl-3-methoxy-6-methylenestra-1,3,5(10)-trien-17β-ol.

Reaction of the instant 3-alkanoyloxy-6-alkylidenestra-1,3,5(10)-trien-17-ones with an alkyl magnesium bromide results in the corresponding 17α-alkyl-6-alkylidenestra-1,3,5(10)-triene-3,17β-diols. For example, the reaction of 3-acetoxy-6-methylenestra-1,3,5(10)-trien-17-one with ethyl magnesium bromide in diethyl ether-tetrahydrofuran solution at the reflux temperature results in 17α-ethyl-6-methylenestra-1,3,5(10)-triene-3,17β-diol.

The lower alkanoates of this invention are prepared by way of the 3,17β-diols, utilizing standard acylating conditions. The 3-monoesters are preferably prepared by selective esterification of the diol. For example, 6-methylenestra-1,3,5(10)-triene-3,17β-diol is treated with a limited quantity of acetic anhydride in the presence of potassium hydroxide to afford 3-acetoxy-6-methylenestra-1,3,5(10)-trien-17β-ol. Treatment of the instant 3,17β-diols with a lower alkanoic acid anhydride in pyridine produces the corresponding instant 3,17β-bis-(lower alkantoates), which are preferentially hydrolyzed to yield the 17β-monoesters of this invention. An example of this process is the esterification of 6-methylenestra-1,3,5(10)-triene-3,17β-diol with propionic anhydride in pyridine, resulting in 6-methylene-3,17β-dipropionoxyestra-1,3,5(10)-triene, which affords 6-methylene-17β-propionoxyestra-1,3,5(10)-trien-3-ol upon treatment with aqueous sodium hydroxide in ethanol.

The compounds of this invention are useful as a result of their valuable pharmacological properties. They have, for example, the capacity to decrease the serum concentration of cholesterol and the corresponding cholesterol/phospholipid ratio without at the same time producing the potent estrogenic side effects characteristic of prior art compositions adapted to regulation of cholesterol metabolism.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a solution of 7 parts of 3,17β-diacetoxyestra-1,3,5(10)-trien-6-one in 90 parts of methanol is added a solution of 4 parts of potassium hydroxide in 20 parts of water. This mixture is heated at reflux for about one and one-half hours, then cooled and treated first with 6 parts of dimethyl sulfate, then about 5 minutes later, with 15 parts of 20% aqueous potassium hydroxide. This process of alternate addition of the aforementioned portions of dimethyl sulfate and aqueous potassium hydroxide is repeated 3 more times, then the reaction mixture diluted with about 1500 parts of water. The resulting product is collected by filtration and recrystallized from acetone-petroleum ether to afford pure 17β-hydroxy-3-methoxyestra-1,3,5(10)-trien-6-one, which displays a double melting point at about 81° and 132–135°.

By substituting an equivalent quantity of diethyl sulfate and otherwise proceeding according to the herein described processes, 3-ethoxy-17β-hydroxyestra-1,3,5(10)-trien-6-one is obtained.

*Example 2*

To a mixture of 5.7 parts of triphenylphosphine-methylene in 85 parts of tetrahydrofuran and 10 parts of diethyl ether is added a solution of one part of 17β-hydroxy-3-methoxyestra-1,3,5(10)-trien-6-one in 85 parts of tetrahydrofuran. This mixture is stirred at room temperature, under nitrogen, for about 16 hours, then heated at reflux for about 6 hours, and finally treated with about 200 parts of water. The layers are separated and the aqueous layer extracted with ether. This ether extract is combined with the organic layer and the resulting solution washed with water, dried over anhydrous sodium sulfate, and evaporated to yield a yellow gummy residue. This residue is adsorbed on magnesiated silica, eluted with benzene, and recrystallized from acetone-isopropyl ether to afford 3-methoxy-6-methylenestra-1,3,5(10)-trien-17β-ol, M.P. about 124.5–127°.

The substitution of an equivalent quantity of 3-ethoxy-17β-hydroxyestra-1,3,5(10)-trien-6-one in the herein-described process results in 3-ethoxy-6-methylenestra-1,3,5(10)-trien-17β-ol.

*Example 3*

A mixture of 6.0 parts of triphenylphosphine-ethylene in 100 parts of tetrahydrofuran and 12 parts of diethyl ether is treated with a solution of one part of 17β-hydroxy-3-methoxyestra-1,3,5(10)-trien-6-one in 85 parts of tetrahydrofuran. This reaction mixture is treated and worked up by the process described in Example 2 to produce 6-ethylidene-3-methoxyestra-1,3,5(10)-trien-17β-ol, which exhibits maxima in the ultraviolet at 255 and 300 millimicrons with molecular extinction coefficients of 9,800 and 3,100, respectively.

By substituting equivalent quantities of 3-ethoxy-17β-hydroxyestra - 1,3,5(10) - trien-6-one and triphenylphosphinepropylene in the process of this example, 3-ethoxy-6-propylidenestra-1,3,5(10)-trien-17β-ol is obtained.

*Example 4*

To a solution of 1.5 parts of 3-methoxy-6-methylenestral-1,3,5(10)-trien-17β-ol in 70 parts of toluene and 15 parts of cyclohexanone is added a solution of 1.25 parts of aluminum isopropoxide in 4.5 parts of toluene. The resulting reaction mixture is heated at reflux for about 75 minutes, then cooled and treated with 15 parts of a saturated aqueous solution of sodium potassium tartrate tetrahydrate. The organic layer is separated, washed with water, and concentrated to dryness at reduced pressure. Crystallization of the residue from acetone-petroleum ether affords 3-methoxy-6-methylenestra-1,3,5(10)-trien-17-one, M.P. about 135–138.5°.

By substituting an equivalent quantity of 6-ethylidene-3-methoxyestra-1,3,5(10)-trien-17β-ol or of 3-ethoxy-6-propylidenestra-1,3,5(10)-trien-17β-ol and otherwise proceeding according to the herein described processes, 6-ethylidene-3-methoxyestra-1,3,5(10)-trien-17-one and 3-ethoxy-6-propylidenestra-1,3,5(10)-trien-17-one are obtained.

*Example 5*

A mixture of 14 parts of 17α-ethyl-3-methoxyestra-1,3,5,(10)-trien-17β-ol, 70 parts of acetic anhydride, 70 parts of acetic acid, and 10 parts of anhydrous sodium acetate is heated to about 70°. A solution of 20 parts of anhydrous sodium chromate in 90 parts of acetic anhydride and 90 parts of acetic acid is then added dropwise over a period of about 5 hours, at 70° during which time a rapid stream of dry air is passed through the reaction mixture. The mixture is then cooled by means of an ice bath, treated with a solution of 25 parts of methanol in 100 parts of water, and allowed to stand at room temperature for about 3 hours. Approximately 1,500 parts of water are then added and the resulting mixture is extracted with benzene. The organic layer is separated, washed successively with water and saturated aqueous sodium bicarbonate, dried over anhydrous sodium sulfate and evaporated to dryness in vacuo. Crystallization of the residue from acetone affords pure 17α-ethyl-17β-hydroxy-3-methoxyestra-1,3,5(10)-trien-6-one, which exhibits maxima in the ultraviolet at 254 and 322 millimicrons with molecular extinction coefficients of 8,300 and 2,900, respectively.

By substituting an equivalent quantity of 3-methoxy-17α - methylestra-1,3,5(10)-trien-17β-ol and otherwise proceeding according to the herein described processes, 17β - hydroxy - 3-methoxy-17α-methylestra-1,3,5(10)-trien-6-one is obtained.

*Example 6*

A mixture of 3.25 parts of 17α-ethyl-17β-hydroxy-3- methoxyestra-1,3,5(10)-trien-6-one in 300 parts of tetrahydrofuran is added to a mixture of 17.1 parts of triphenylphosphinemethylene in 260 parts of tetrahydrofuran and 30 parts of diethyl ether. The resulting mixture is allowed to react in an atmosphere of nitrogen at room temperature, with stirring, for about 20 hours, then heated at reflux for about 8 hours. Approximately 600 parts of water is added and the resulting mixture is extracted with ether. The organic layer is separated, washed with water, dried over anhydrous sodium sulfate, and concentrated to dryness in vacuo. The residue in adsorbed on magnesiated silica and eluted with benzene to afford 17α-ethyl-3-methoxy-6-methylenestra-1,3,5(10)-trien-17β-ol. This substance displays maxima in the ultraviolet at 254.5 and 305 millimicrons with molecular extinction coefficients of 10,000 and 3,000, respectively.

The substitution of an equivalent quantity of 17β-hydroxy-3-methoxy-17α-methylestra-1,3,5(10)-trien-6-one in the herein-described process results in 3-methoxy-17α-methyl-6-methylenestra-1,3,5(10)-trien-17β-ol.

Example 7

A mixture of 9 parts of finely ground potassium hydroxide in 50 parts of diethylene glycol dimethyl ether and 2.5 parts of diethylene glycol monoethyl ether is saturated at −5° with gaseous acetylene. A solution of 1.5 parts of 3-methoxy-6-methylenestra-1,3,5(10)-trien-17-one in 22 parts of diethylene glycol dimethyl ether is then added and the resulting mixture is stirred at 0° for about 2 hours while the addition of acetylene is continued. Dilution of the reaction mixture with about 800 parts of water results in precipitation of the product, which is collected by filtration and crystallized from isopropyl ether to afford 17α-ethynyl-3-methoxy-6-methylenestra-1,3,5-(10)-trien-17β-ol, M.P. about 116.5–119°.

The substitution of an equivalent quantity of propyne for acetylene in the process of this example results in 3-methoxy-6-methylene-17α-(1-propynyl)estra-1,3,5(10)-trien-17β-ol.

Example 8

To a mixture of 12 parts of triphenylphosphinemethylene in 150 parts of tetrahydrofuran and 20 parts of diethyl ether is added a solution of 2 parts of 3,17β-diacetoxyestra-1,3,5,(10)-trien-6-one in 150 parts of tetrahydrofuran. This reaction mixture is stored at room temperature for about 12 hours, then heated at reflux for about 7 hours, cooled, and diluted with about 300 parts of water. The aqueous layer is extracted with diethyl ether and this extract combined with the organic layer. This organic solution is washed with water, dried over anhydrous sodium sulfate, and evaporated to dryness in vacuo. To the residue is added 20 parts of pyridine and 10 parts of acetic anhydride and the mixture is stored at room temperature for about 16 hours. Distillation at reduced pressure removes the excess reagents, leaving a residue which is adsorbed on magnesiated silica and eluted with benzene. Recrystallization of the eluted material from petroleum ether produces 3,17β-diacetoxy-6-methylenestra-1,3,5(10)-triene, which displays infrared maxima at about 5.68, 5.77, and 11.23 microns.

Example 9

A solution of 2 parts of potassium hydroxide in 10 parts of water is added to a solution of 5 parts of 3,17β-diacetoxy-6-methylenestra-1,3,5(10)-triene in 100 parts of methanol, and the resulting mixture heated at reflux for about 3 hours. Distillation of the methanol in vacuo leaves a mixture which is acidified by means of hydrochloric acid to cause precipitation of the product. It is collected by filtration and recrystallized from aqueous methanol to yield 6-methylenestra-1,3,5(10)-triene-3,17β-diol, which exhibits maxima in the infrared at about 2.78 and 11.25 microns.

Example 10

A mixture of one part of 6-methylenestra-1,3,5(10)-triene-3,17β-diol, 20 parts of pyridine, and 13 parts of propionic anhydride is allowed to stand at room temperature for about 15 hours, then diluted with water. The resulting mixture is extracted with benzene, then the organic layer washed successively with dilute hydrochloric acid and water, dried over anhydrous sodium sulfate, and concentrated to dryness. Recrystallization of the residue from acetone-petroleum ether results in 6-methylene-3,17β-dipropionoxyestra-1,3,5(10)-triene, which displays infrared maxima at about 3.23, 5.67, 5.77, and 6.15 microns.

Example 11

A solution of 10 parts of 3,17β-diacetoxy-6-methylenestra-1,3,5(10)-triene in 200 parts of ethanol is mixed with a solution of 1.08 parts of sodium hydroxide in 10 parts of water. This mixture is allowed to stand at room temperature for about 30 minutes, then treated with a solution of 2.45 parts of concentrated hydrochloric acid in 20 parts of water. Most of the ethanol is removed by distillation, and approximately 200 parts of water is added. The resulting product is isolated by filtration and recrystallized from isopropyl ether to produce 17β-acetoxy-6-methylenestra-1,3,5(10)-trien-3-ol, which exhibits maxima in the infrared at about 2.85, 3.22, and 5.78 microns.

The substitution of an equivalent quantity of 6-methylene-3,17β-dipropionoxyestra-1,3,5(10)-triene in the herein-described process results in 6-methylene-17β-propionoxyestra-1,3,5(10)-trien-3-ol.

Example 12

To a solution of 5.9 parts of potassium hydroxide in 200 parts of water is added successively 20 parts of 6-methylenestra-1,3,5(10)-triene-3,17β-diol, 100 parts of crushed ice, and 10 parts of acetic anhydride. This reaction mixture is stirred for about 20 minutes and the resulting precipitate is collected by filtration, then recrystallized from isopropyl ether to yield 3-acetoxy-6-methylenestra-1,3,5(10)-trien-17β-ol. This monoester exhibits maxima in the infrared at about 2.82, 5.66, and 11.25 microns.

By substituting an equivalent quantity of propionic anhydride and otherwise proceeding according to the process of this example, 6-methylene-3-propionoxyestra-1,3,5(10)-trien-17β-ol is obtained.

Example 13

A chromium trioxide-pyridine complex is prepared by the addition of 12 parts of chromium trioxide to 120 parts of pyridine. To this slurry is added a solution of 20 parts of 3-acetoxy-6-methylenestra-1,3,5(10)-trien-17β-ol in 50 parts of pyridine, and the mixture allowed to stand at room temperature for about 16 hours, then treated with about 500 parts of ethyl acetate and filtered. The filtrate is washed with saturated aqueous sodium chloride, dried over anhydrous sodium sulfate, and concentrated to dryness in vacuo. Recrystallization of the residue from aqueous acetone results in 3-acetoxy-6-methylenestra-1,3,5(10)-trien-17-one, which exhibits infrared maxima at about 5.68, 5.75, and 6.15 microns.

The substitution of an equivalent quantity of 6-methylene-3-propionoxyestra-1,3,5(10)-trien-17β-ol in the herein-described process results in 6-methylene-3-propionoxyestra-1,3,5(10)-trien-17-one.

Example 14

A mixture of 8.8 parts of 3-acetoxy-6-methylenestra-1,3,5(10)-trien-17-one, 200 parts of ethanol, 1.08 parts of sodium hydroxide, and 10 parts of water is submitted to the procedure described in Example 11. The resulting product, 3-hydroxy-6-methylenestra-1,3,5(10)-trien-17-one, displays infrared maxima at 2.82, 3.22, and 5.75 microns.

Example 15

To a solution of 8 parts of 3-acetoxy-6-methylenestra-1,3,5(10)-trien-17-one in 100 parts of tetrahydrofuran is added a solution of 8 parts of ethyl magnesium bromide in 40 parts of diethyl ether and 40 parts of tetrahydrofuran, and the mixture is concentrated until its temperature reaches 60°. It is then heated at reflux for about 6 hours, cooled, and the excess Grignard reagent destroyed by the cautious addition of water. The mixture is treated further with about 400 parts of water, then the aqueous layer separated and extracted with diethyl ether. This extract is combined with the organic layer and the resulting organic solution washed with water, dried over anhydrous sodium sulfate, and evaporated to dryness at reduced pressure. Adsorption of the residue on magnesiated silica followed by elution with 2% ethyl acetate in benzene and recrystallization from aqueous methanol affords 17α-ethyl-6-methylenestra-1,3,5(10)-triene-3,17β-diol. This substance displays infrared maxima at about 2.76 and 11.22 microns.

By substituting an equivalent quantity of methyl magnesium bromide in the process of this example, 17α-methyl-6-methylenestra-1,3,5(10)-triene-3,17β-diol is obtained.

Example 16

A mixture of 11 parts of 17α-ethyl-6-methylenestra-1,3,5(10)-triene-3,17β-diol, 3 parts of potassium hydroxide, and 100 parts of water is treated with 5.35 parts of acetic anhydride according to the process disclosed in Example 12. The product is isolated as described in that example, resulting in 3-acetoxy-17α-ethyl-6-methylenestra-1,3,5(10)-trien-17β-ol. This substance exhibits infrared maxima at 2.78, 5.66, and 6.15 microns.

Example 17

A mixture of 5 parts of 17α-ethyl-6-methylenestra-1,3,5(10)-triene-3,17β-diol in 25 parts of acetic anhydride is heated at reflux for about one hour, then concentrated to dryness in vacuo. The residue is crystallized from isopropyl ether to afford pure 3,17β-diacetoxy-17α-ethyl-6-methylenestra-1,3,5(10)-triene, which exhibits infrared maxima at 3.24, 5.67, and 5.78 microns.

The substitution of an equivalent quantity of propionic anhydride is the process of this example results in 17α-ethyl-6-methylene-3,17β-dipropionoxyestra-1,3,5(10)-triene.

Example 18

By the procedure described in Example 11, 3,17β-diacetoxy-17α-ethyl-6-methylenestra-1,3,5(10)-triene is converted to 17β-acetoxy-17α-ethyl-6-methylenestra-1,3,5-(10)-trien-3-ol. It displays maxima in the infrared at 2.85, 3.22, and 5.78 microns.

Example 19

A solution of 1.43 parts of 3-hydroxy-6-methylenestra-1,3,5(10)-trien-17-one in 25 parts of diethylene glycol dimethyl ether is reacted with acetylene according to the process described in Example 7. Dilution of the reaction mixture with water, followed by acidification with dilute hydrochloric acid causes precipitation of the product, which is collected by filtration and dried to yield 17α-ethynyl-3-hydroxy-6-methylenestra-1,3,5(10)-trien - 17β-ol. This substance exhibits infrared maxima at about 2.77, 3.02, and 11.28 microns.

Example 20

By the procedures of Examples 16, 17, and 18, 17α-ethynyl-6-methylenestra-1,3,5(10)-triene-3,17β-diol is converted to 3-acetoxy-17α-ethynyl-6-methylenestra-1,3,5-(10)-trien-17β-ol; 3,17β - diacetoxy-17α - ethynyl-6-methylenestra-1,3,5(10)-triene; and 17β-acetoxy-17α-ethynyl-6-methylenestra-1,3,5(10)-trien-3-ol, respectively.

What is claimed is:

1. A compound of the structural formula

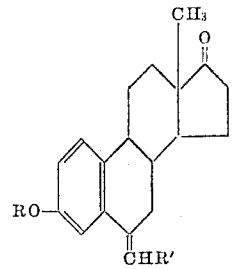

wherein R is selected from the group consisting of hydrogen, lower alkyl, and lower alkanoyl radicals; and R' is selcted from the group consisting of hydrogen and lower alkyl radicals.

2. 3-methoxy - 6 - methylenestra - 1,3,5(10) - trien-17-one.

3. A compound of the structural formula

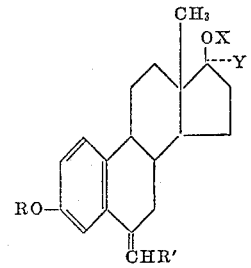

wherein R is selected from the group consisting of hydrogen, lower alkyl, and lower alkanoyl radicals; R' is selected from the group consisting of hydrogen and lower alkyl radicals; X is selected from the group consisting of hydrogen and lower alkanoyl radicals; and Y is selected from the group consisting of hydrogen, lower alkyl, and lower 1-alkynyl radicals.

4. 3 - methoxy - 6 - methylenestra - 1,3,5(10) - trien-17β-ol.

5. 6 - ethylidene - 3 - methoxyestra - 1,3,5(10) - trien-17β-ol.

6. 17α - ethynyl - 3 - methoxy - 6 - methylenestra-1,3,5(10)-trien-17β-ol.

7. 17α - ethyl - 3 - methoxy - 6 - methylenestra - 1,3,5(10)-trien-17β-ol.

No references cited.